United States Patent [19]
Ai

[11] Patent Number: 5,975,762
[45] Date of Patent: Nov. 2, 1999

[54] TAPERED ROLLER BEARING WITH TRUE ROLLING CONTACTS

[75] Inventor: Xiaolan Ai, Stark County, Ohio

[73] Assignee: The Timken Company, Canton, Ohio

[21] Appl. No.: 08/949,552

[22] Filed: Oct. 14, 1997

[51] Int. Cl.⁶ .................................................... F16C 33/58
[52] U.S. Cl. ......................... 384/450; 384/551; 384/571
[58] Field of Search ..................................... 384/450, 571, 384/565, 551, 553

[56] References Cited

U.S. PATENT DOCUMENTS

| | | |
|---|---|---|
| 700,145 | 5/1902 | Larned . |
| 813,905 | 2/1906 | Lockwood . |
| 907,908 | 12/1908 | Springer . |
| 931,924 | 8/1909 | Hess . |
| 954,529 | 4/1910 | Lockwood . |
| 956,588 | 5/1910 | Lockwood . |
| 958,143 | 5/1910 | Lockwood . |
| 958,963 | 5/1910 | Lockwood . |
| 1,003,055 | 9/1911 | Lockwood . |
| 1,058,767 | 4/1913 | Lockwood . |
| 1,096,530 | 5/1914 | Hess . |
| 1,226,345 | 5/1917 | Lockwood . |
| 1,283,713 | 11/1918 | Fjellman . |
| 1,404,430 | 1/1922 | Brush . |
| 1,410,988 | 3/1922 | Birgh . |
| 1,511,480 | 10/1924 | Knowles . |
| 1,548,821 | 8/1925 | Bronander . |
| 1,552,031 | 9/1925 | Birgh . |
| 1,593,580 | 7/1926 | Knowles . |
| 1,622,618 | 3/1927 | Vervoort . |
| 1,914,548 | 6/1933 | Wingquist . |
| 2,089,048 | 8/1937 | Bachman . |
| 2,130,379 | 9/1938 | Chilton . |
| 2,221,514 | 11/1940 | Foley . |
| 2,255,035 | 9/1941 | Foley . |
| 2,387,962 | 10/1945 | Williams . |
| 2,417,398 | 3/1947 | Rundt . |
| 2,577,589 | 12/1951 | Palmgren . |
| 2,586,406 | 2/1952 | Wallgren . |

FOREIGN PATENT DOCUMENTS

| | | |
|---|---|---|
| 0551516 | 7/1993 | European Pat. Off. . |
| 72303 | 5/1916 | Switzerland . |

*Primary Examiner*—Lenard A. Footland
*Attorney, Agent, or Firm*—Polster, Lieder, Woodruff & Lucchesi

[57] ABSTRACT

A tapered roller bearing has inner and outer races and tapered rollers organized in at least two rows, with the rollers of the one row being generally aligned with the rollers in the other row. The large ends of the rollers are presented toward each other so that the forces which urge the rollers of either row up their tapered raceways are resisted by the rollers of the other row. The end faces of the aligned rollers in the two rows contact each other or else contact intervening elements such as cylindrical rollers or a separating disks. The geometry of the rollers and the raceways along which they roll are such that, when one race rotates relative to the other race, pure rolling contact exists between the side faces of the rollers and the raceways and pure rolling contact also exists at the end faces of the rollers. Moreover, the lines of contact for the aligned rollers of any set are synchronized and the rollers are stable. Thus, the rollers remain in position within the bearing and the aligned rollers of any set track each other.

21 Claims, 7 Drawing Sheets

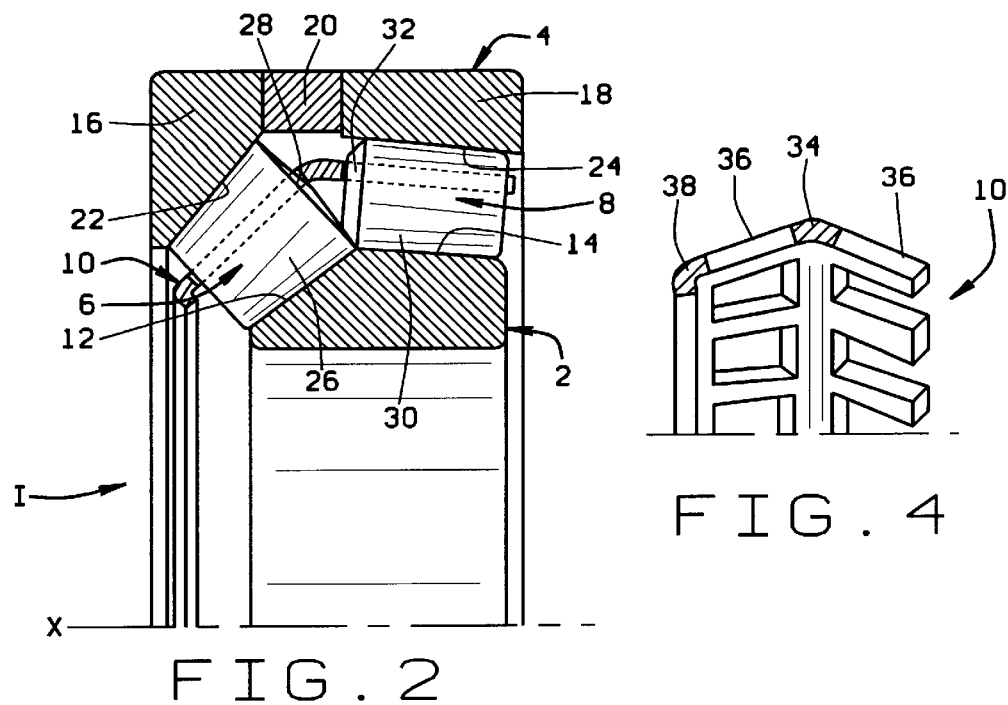
FIG. 2
FIG. 4
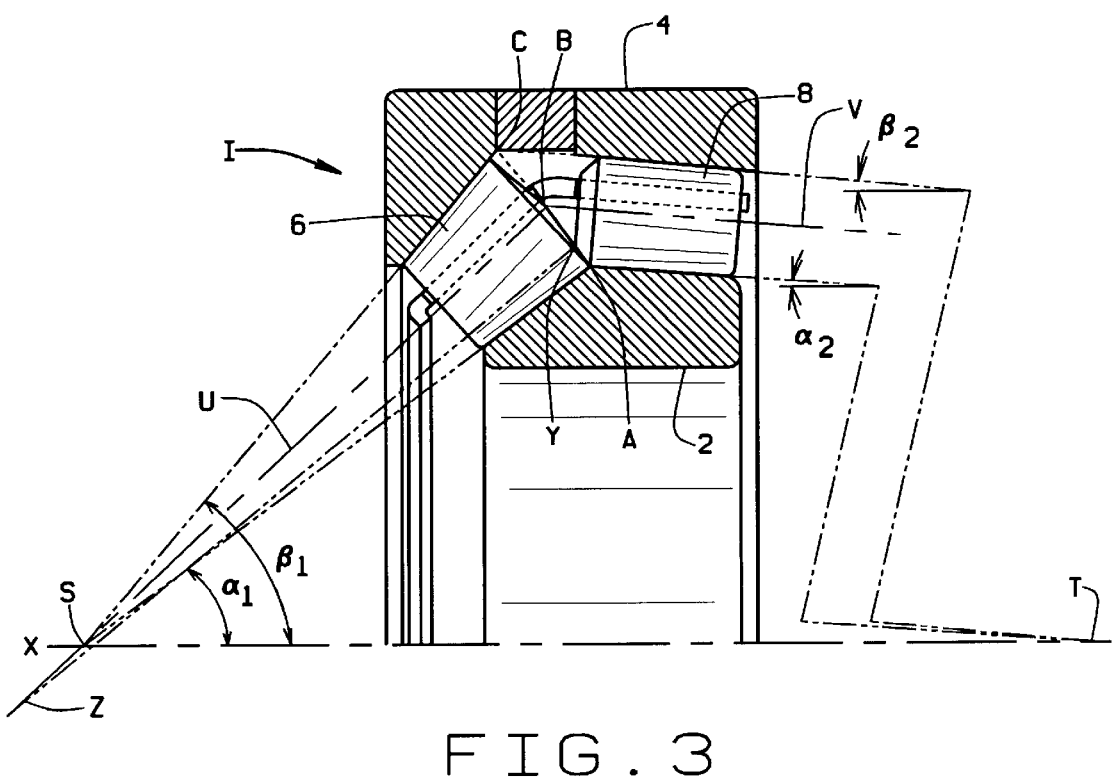
FIG. 3

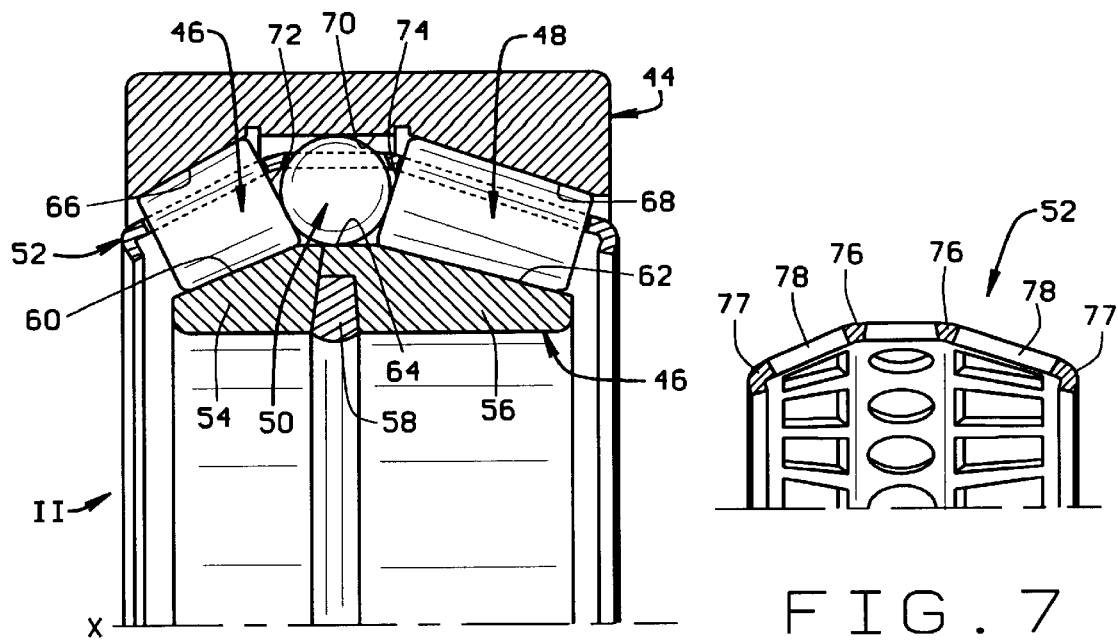
FIG. 5
FIG. 7
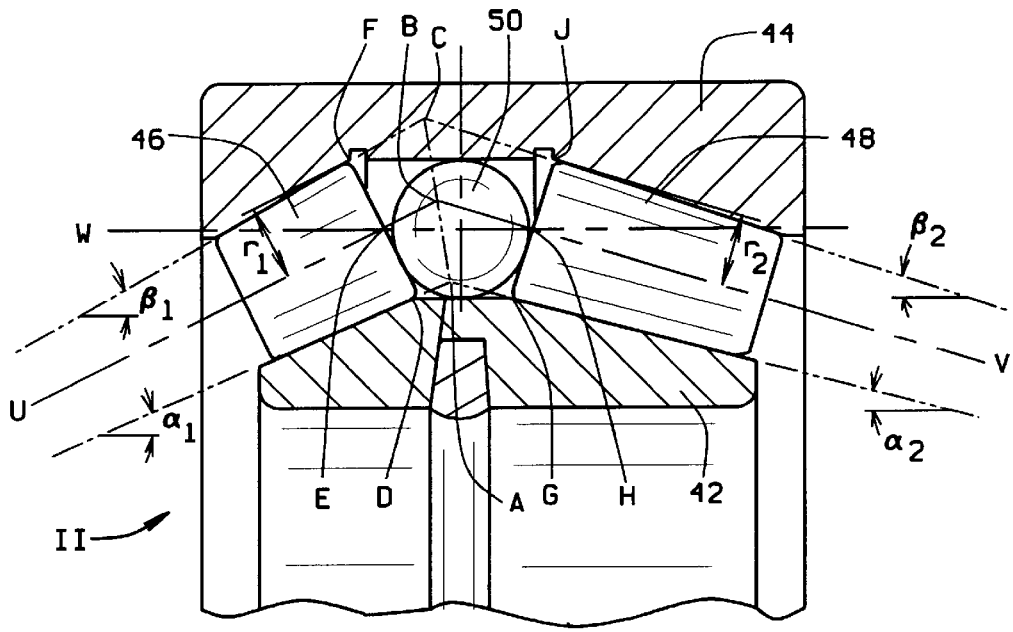
FIG. 6

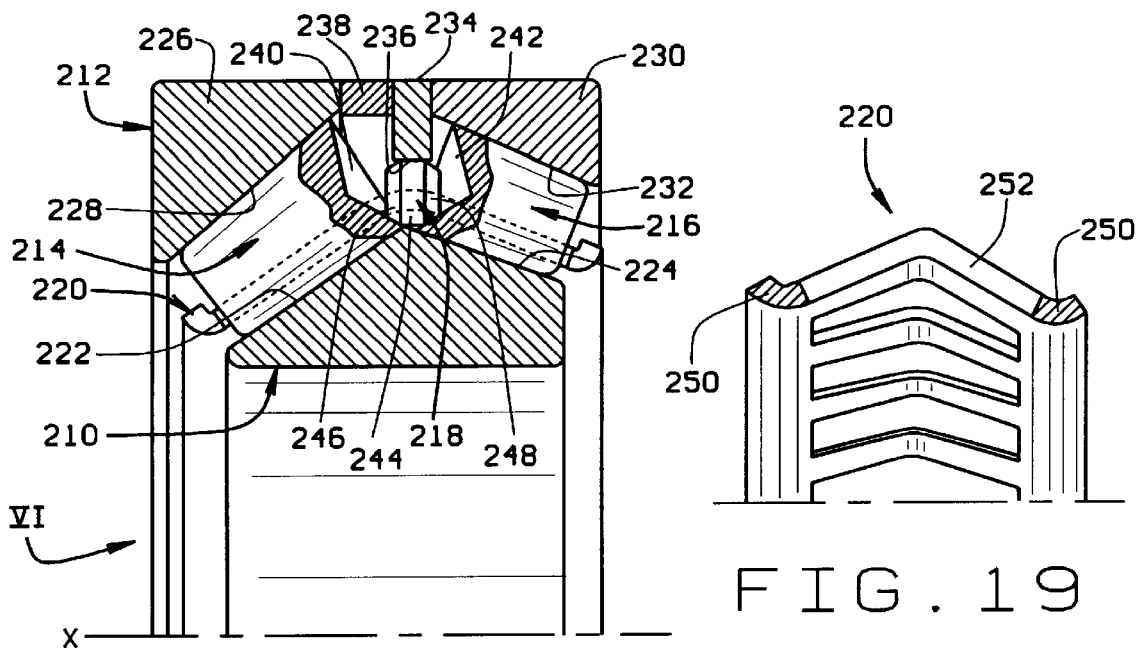
FIG. 17
FIG. 19
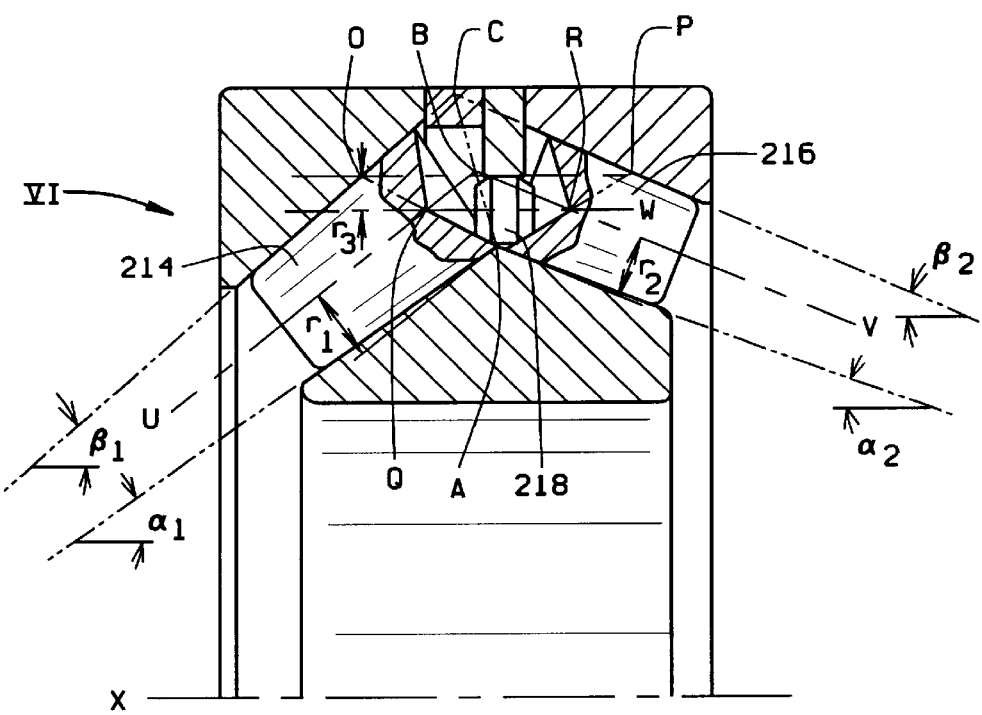
FIG. 18

TAPERED ROLLER BEARING WITH TRUE ROLLING CONTACTS

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to tapered roller bearings, and more particularly to tapered roller bearings in which true rolling contact exists at all critical surfaces during operation of the bearing.

Antifriction bearings come in several basic configurations, but irrespective of its configuration, an antifriction bearing includes a pair of ring-like races and rolling elements arranged in at least one row between the races. The rolling elements contact raceways on the races, and when the bearing is set in operation, the rolling elements roll along those raceways and around the axis of the bearing.

When the rolling elements take the form of cylindrical rollers, the bearing has the capacity to take heavy radial loads, but is not very satisfactory for transmitting thrust loads. Moreover, cylindrical roller bearings usually have radial clearances, and thus are not suitable in applications requiring stability, rigidity and a good measure of precision. A ball bearing in which the rolling elements are balls may have its raceways oblique to the axis of the bearing so that the bearing takes radial and thrust loads. When arranged in pairs, angular ball bearings may be adjusted against each other to eliminate end play—and radial clearances as well—but the load capacity of an angular ball bearing is relatively low. A tapered roller bearing possesses the advantages of both cylindrical roller bearings and angular ball bearings. It has the capacity to carry heavy radial loads and also thrust loads, all through its tapered rollers and the raceways along which they roll. As a consequence, a tapered roller bearing may be adjusted to eliminate clearances between its rollers and raceways.

Owing to the tapered geometry of a tapered roller bearing, the tapered rollers tend to move up the raceways and unless restrained will be expelled from the bearing. For this reason, the conventional tapered roller bearing has a thrust rib at the large end of one of its raceways, usually on the inner race which is called the cone. As the rollers roll along the raceways, the large end faces of the rollers bear against the thrust rib and the rollers remain in place axially. While generally pure rolling contact exists between the tapered side faces of the rollers and the raceways, the end faces of the rollers slide and spin along the face of the thrust rib. In the absence of adequate lubrication, the bearing may fail at this critical area, for here the friction is highest within the bearing. Moreover, due to the slide and spin motion between the roller ends and the thrust rib, the torque within a tapered roller bearing operating at low speed, is relatively high and, to a measure wear as well.

BRIEF SUMMARY OF THE INVENTION

The present invention resides in tapered roller bearings that have true rolling contact along all critical load-bearing surfaces. In the absence of their normal supply of lubrication, the bearings will remain operational for sustained periods of time. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur:

FIG. 2 is a sectional view of a double row tapered roller bearing in which pure rolling contact exists at all critical surfaces;

FIG. 3 is a sectional view similar to FIG. 2, but showing the envelopes in which the rollers and raceways exist and other reference lines and points, as well as significant angles;

FIG. 4 is a fragmentary view of the cage for the bearing of FIG. 2;

FIG. 5 is a sectional view of another double row tapered bearing in which pure rolling contact exists, with spherical separating elements being located between the tapered rollers of the two rows;

FIG. 6 is a sectional view similar to FIG. 5 and showing reference lines and points and angles;

FIG. 7 is a fragmentary view of the cage for the bearing of FIG. 5;

FIG. 17 is a sectional view of another double row tapered roller bearing in which the rollers of the two rows are separated by disks, there being pure rolling contact at all critical surfaces in the bearing;

FIG. 18 is a sectional view similar to FIG. 17 and showing reference lines and points and angles; and FIG. 19 is a fragmentary view of the cage for the bearing of FIG. 17.

DETAILED DESCRIPTION OF THE INVENTION

The bearings of this invention all include tapered rollers arranged in two rows between tapered raceways and may include additional rolling elements between the two rows of tapered rollers. The tapered rollers of the one row back the tapered rollers of the other row and vice versa, so that the tapered rollers remain in place between their respective raceways, defying the natural tendency to move up the raceways. Where the bearing contains only two rows of tapered rollers and no intervening rolling elements, one row directly backs the other row, that is the rollers of the two rows contact each other along their large end faces. However, where the bearing contains intervening elements, the backing is indirect; that is to say, the backing or resisting force applied to the tapered rollers of the two rows is transferred through the rolling elements of the intervening row.

In order for the tapered rollers to effectively back each other, the rollers in the two rows must be equal in number and furthermore must be aligned. The same hold true for the intervening rolling elements; they are equal in number to the tapered rollers in each of the two rows and are aligned with those rollers. Thus, within the bearing the rollers and any rolling elements are organized into sets, with each set including a tapered roller of one row, the corresponding aligned tapered roller of the other row, and any intervening element that is located between the aligned tapered rollers.

The side faces of the tapered rollers contact the tapered raceways between which the rollers revolve, and here pure rolling contact exists. This derives from the on-apex design of the raceways. In an on-apex design, the envelopes formed by the raceways for a row of tapered rollers will meet at a common point along the axis of the bearing. Also, where the roller of one row contacts the corresponding roller of the other row or where corresponding rollers of the two rows contact an intervening rolling element that lies between them pure rolling contact exists. Where intervening rolling elements exist in a bearing, so does a raceway to guide and position the intervening rolling elements, and pure rolling contact likewise exists between the intervening rolling elements and their raceway or raceways as well. Thus, at all points or lines of contact between the tapered rollers, the raceways, and the intervening elements, pure rolling contact exists and with it the absence of any significant friction.

Furthermore, the rollers and intervening element, if any, of a set are configured to track each other. As a consequence, the rollers of the two rows and the intervening elements remain synchronized.

Figure 1A:
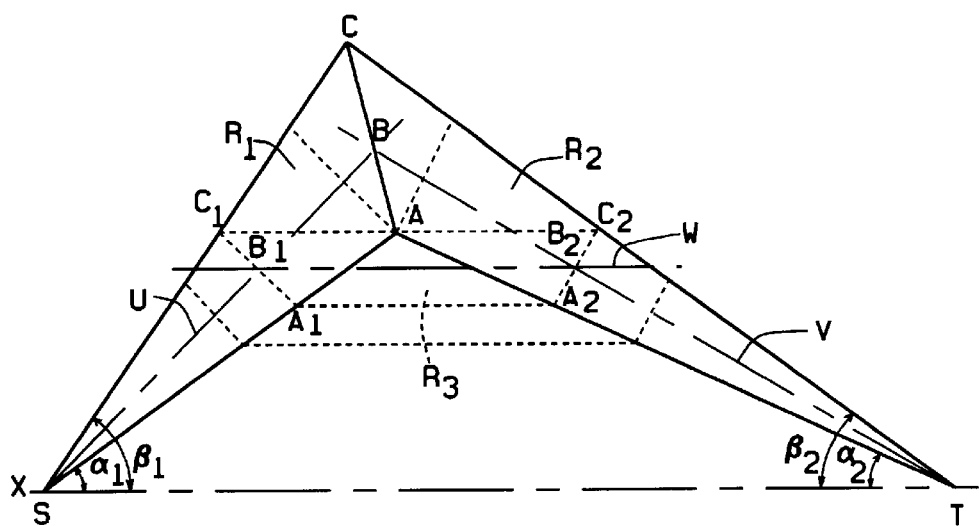
FIGS. 1a, b, c are schematic views illustrating the fundamental design geometry in bearings of the present invention.

The fundamental design concept for a bearing having pure rolling contact where tapered rollers, raceways and intervening rolling elements, if any, are in contact may be illustrated schematically (FIG. 1a). The bearing has an axis X and tapered rollers $R_1$ and $R_2$ arranged in two rows around the axis X, with the large ends of the rollers $R_1$ and $R_2$ generally presented toward each other. Each roller $R_1$ lies between and rolls along tapered raceways, revolving about its own axis U as it does. The axis U of the roller $R_1$ intersects the bearing axis X at point S. The conical envelopes for the raceways lie at angles $\alpha_1$ and $\beta_1$ with respect to the axis X and intersect the axis X at the same point S. Hence, the roller $R_1$ is on apex. Likewise, each roller $R_2$ lies between and rolls along tapered raceways and revolves about its own axis V as it does. The axis V intersects the bearing axis X at point T which is offset from point S. The envelopes for the two raceways for the roller $R_2$ lie at angles $\alpha_2$ and $\beta_2$ with respect to the axis X and intersect the axis X at point T. Thus, the rollers $R_2$ are likewise on apex. The envelopes for the two inner raceways, that is the ones that lie at the angles $\alpha_1$ and $\alpha_2$, intersect at point A. The envelopes for the two outer raceways, which lie at the angles $\beta_1$ and $\beta_2$, intersect at point C. Actually, in the bearing itself, the envelopes of the raceways intersect at circles, but when the bearing is considered schematically in a plane, the circles of intersection become points of intersection. The axes U and V for the two rollers $R_1$ and $R_2$ intersect at point B. Points A, C and B lie in a straight line. The following angular relationship exists in the bearing:

$$\frac{\sin\alpha_1}{\sin\beta_1} = \frac{\sin\alpha_2}{\sin\beta_2}$$

The tapered rollers $R_1$ and $R_2$, in the absence of intervening rolling elements, should abut along the line ABC, and when they do, line ABC represents a line of pure rolling contact between the rollers $R_1$ and $R_2$. This line ABC during the operation of the bearing remains synchronized with the lines SA and SC representing pure rolling contact between the roller $R_1$ and the raceways along which it rolls and likewise remains synchronized with the lines TA and TC representing pure rolling contact between the rollers $R_2$ and the raceways along, which it rolls.

But the large ends of the rollers $R_1$ and $R_2$ may be displaced from the line ABC and have their ends at points $A_1$ $C_1$ and $A_2$ $C_2$, respectively, with the axis U being perpendicular to and intersecting the line $A_1$ $C_1$ at point $B_1$ and the axis V being perpendicular to and intersecting the line $A_2$ $C_2$ at $B_2$. The points $B_1$ and $B_2$ define the axis W for an intervening rolling element in the form of a cylindrical roller $R_3$ that lies between the rollers $R_1$ and $R_2$ and contacts one raceway defined by the points $A_1A_2$ and another defined by the points $C_1$ $C_2$. The cylindrical roller $R_3$ contacts the roller $R_1$ along the line $A_1$ $C_1$ and the roller $R_2$ along the line $A_2$ $C_2$. The line $A_1$ $B_1$ $C_1$ represents a line of pure rolling contact between the roller $R_1$ and the roller $R_3$, whereas the line $A_2$ $B_2$ $C_2$ represents a line of pure rolling contact between the roller $R_2$ and the roller $R_3$.

Figure 1B:
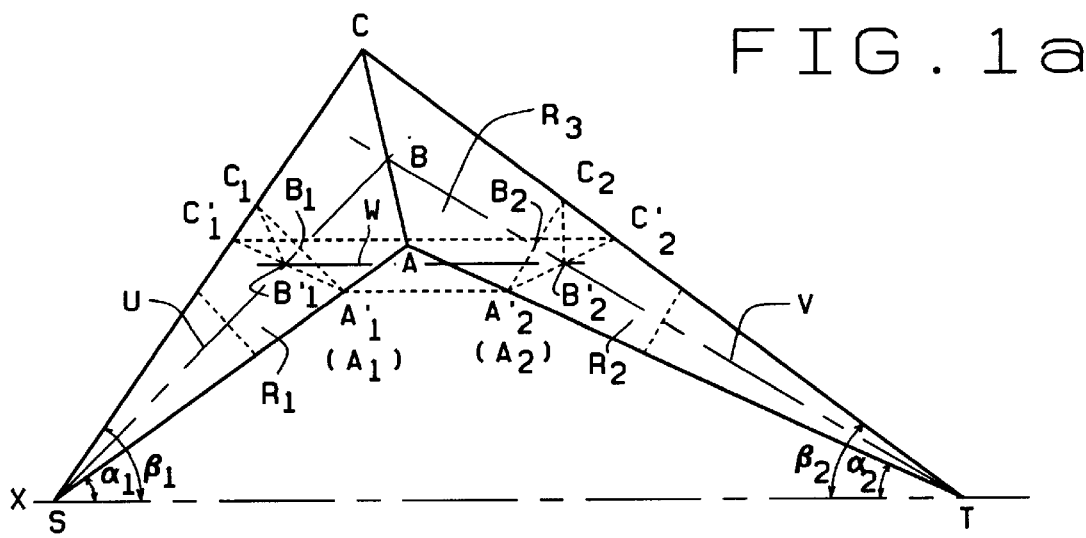

The large ends of the rollers $R_1$ and $R_2$ may also be separated by intervening elements $R_3$ that contact only with rollers $R_1$, $R_2$ and an intervening inner raceway defined by the line connecting points $C_1'$ and $C_2'$ (FIG. 1b). The axis W of the intervening element $R_3$ for any set intersects the axis U of roller $R_1$ at a point $B_1'$ offset from $B_1$ toward point S along axis U, and intersects the axis V of roller $R_2$ at a point $B_2'$ offset from point $B_2$ toward point T along axis V. The extension of $C_1'B_1'$ intersects line SA at a point $A_1$ or $A_1'$ and the extension of $C_2'B_2'$ intersects line TA at a point $A_2$ or $A_2'$. Lines $A_1'B_1'C_1'$ and $A_2'B_2'C_2'$ are pure rolling lines between the roller $R_1$ and separating element $R_3$ and between the roller $R_2$ and the separating element $R_3$, respectively. The separating element $R_3$ would contact the roller $R_1$ along the line $A_1'B_1'C_1'$ and the roller $R_2$ along the line $A_2'B_2'C_2'$. The line $C_1'C_2'$ represents the raceway along which the intervening elements $R_3$ move.

Figure 1C:
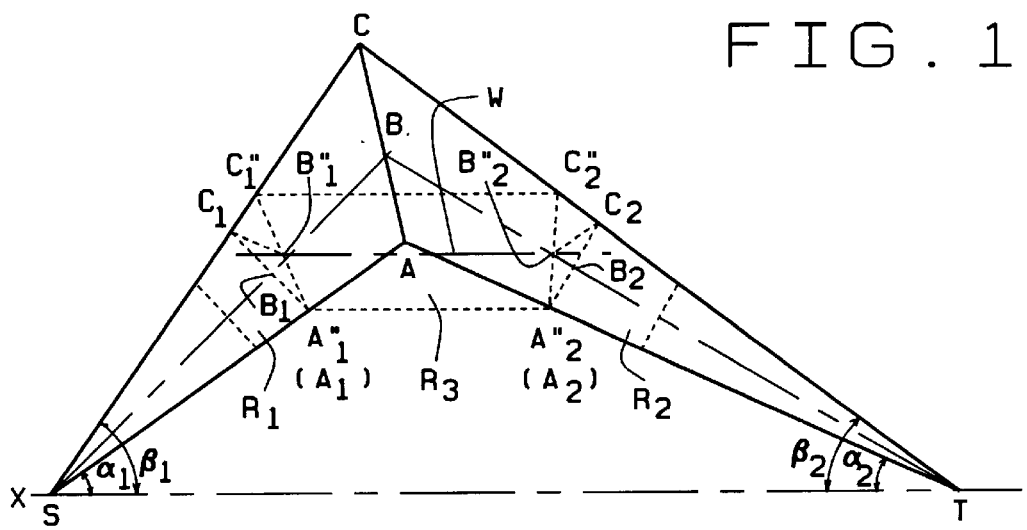

The large ends of the rollers $R_1$ and $R_2$ may likewise be separated by intervening elements $R_3$ that contact only the rollers $R_1$ and $R_2$ and an intervening raceway defined by the line connecting points $A_1''$ and $A_2''$ (FIG. 1c). The axis W of the separating element $R_3$ for any set intersects the axis U of the roller $R_1$ at a point $B_1''$ offset from $B_1$ toward B along the axis U and intersects the axis V of roller $R_2$ at a point $B_2''$ offset from $B_2$ toward B along the axis V. Lines $A_1''B_1''C_1''$ and $A_2''B_2''C_2''$ are pure rolling lines between the roller $R_1$ and the separating element $R_3$, and between the roller $R_2$ and the separating elements $R_3$, respectively. The separating element $R_3$ contacts the roller $R_1$ along the line $A_1''B_1''C_1''$ and the roller $R_2$ along the line $A_2''B_2''C_2''$.

The intervening elements $R_3$ can be rollers, disks, or balls.

The geometry thus far discussed insures that a pure rolling contact exists at all critical lines or points of contact in the bearing. This includes the contacts between the rolling elements and the raceways along which they roll and also the contacts between the rolling elements themselves. The latter contacts keep the rolling elements that are tapered rollers from shifting axially along their raceways. In addition to producing pure rolling contact at all critical areas of contact, the geometry is such that it synchronizes the lines of points of contact. All rolling elements within any set of rolling elements move in unison around the axes. As a consequence, rolling elements of any set track each other. Finally, the geometry imparts stability. This keeps the rolling elements within their proper positions within the bearing and insures that the rolling element of any set track each other.

By way of example, a tapered roller bearing I (FIGS. 2–4) operates with pure rolling contact at all critical surfaces, that is at all surfaces through which loads are transferred, and as a consequence, is less likely to fail in the absence of lubrication. The bearing I, which accommodates rotation about an axis X, basically includes a cone 2, a segmented cup 4 located around the cone 2, a first set of tapered rollers 6 located between the cone 2 and cup 4, a second set of taper rollers 8, likewise located between the cone 2 and cup 4 and a cage 10 which receives the rollers 6 and 8. The cone 2 constitutes the inner race of the bearing I, whereas the cup 4 forms the outer race. The rollers 6 keep the rollers 8 in the proper axial position in the space between the cone 2 and cup 4, and vice versa.

The cone 2 has two tapered raceways 12 and 14 which are presented outwardly away from the axis X and intersect. The raceways 12 and 14 taper downwardly from the line representing their intersection. The raceway 12 lies at an angle $\alpha_1$ with respect to the bearing axis X, whereas the raceway 14 lies at an angle $\alpha_2$ (FIG. 3). The cup 4 consists of three segments, that is two end segments 16 and 18 and an intervening spacer 20. The end segment 16 has a tapered raceway 22 which is presented inwardly toward the raceway 12 of the cone 2, whereas the end segment 18 has a tapered raceway 24 that is presented inwardly toward the raceway 14 of the cone 2. The raceway 22 lies at an angle $\beta_1$ with respect to the bearing axis X, whereas the raceway 24 lies at an angle $\beta_2$.

The tapered rollers 6 of the first set are organized in a single row between the raceways 12 and 22 of the cone 2 and cup segment 16, respectively. Each roller 6 has a tapered side face 26 along which it contacts the raceways 12 and 22, there being essentially line contact between the side face 26 of the roller 6 and the raceways 12 and 22, and a conical end face 28 at the large diameter end of the side face 26. The rollers 6 are on apex, meaning that the envelopes occupied by their side face 26 will have their apexes located at a common points along the axis X of rotation (FIG. 3). Each roller 6 has an axis U of rotation, and it intersects the bearing axis X at the common point as well. The envelopes occupied by the raceways 12 and 22 along which those rollers 6 move have their apexes at the same point.

Basically, the same can be said for the tapered rollers 8 of the second set. They are organized into a single row between the raceways 14 and 24 of the cone 2 and cup segment 18, respectively. Each roller 8 has a tapered side face 30 along which line contact exists with the raceways 14 and 24. In addition, each has a frustoconical end face 32 at the large end of its side face 30. The rollers 8 are on apex, and each has an axis V which intersects the bearing axis X at the common point T established by the apexes for the rollers 8 and the raceways 14 and 24. The rollers 6, in number, equal the rollers 8, and indeed, the rollers 6 and 8 are aligned end to end between the cone 2 and cup 4. Thus, for every roller 6 there is a roller 8 which aligns with it, and this alignment is assisted by the cage 10. Not only do the rollers 6 and 8 of the two rows align, but they further bear against each other at their end faces 28 and 32. Thus, in any pair of aligned rollers 6 and 8, the end faces 28 and 32 of those rollers 6 and 8 will be in contact.

The raceways 12 and 14 of the cone 2 intersect at point A on the cone 2 (FIG. 3). The envelopes occupied by the raceways 22 and 24 of the cup 4 intersect at a point C. The following angular relationship exists in the bearing I:

$$\frac{\sin\alpha_1}{\sin\beta_1} = \frac{\sin\alpha_2}{\sin\beta_2} \tag{i}$$

Thus, the axis U of any roller 6 intersects the axis V of the aligned roller 8 at point B which lies along a line connecting the points A and C. That line ABC represents a line of pure rolling contact between the aligned rollers 6 and 8, and indeed, the conical end face 28 of the roller 6 lies along the line ABC as does the frustoconical end face 32 for the roller 8. But the frustoconical end face 32 does not extend the full length of the line ABC. Instead, it goes no further than point Y. A line perpendicular to the line ABC at point Y intersects the roller axis U at point Z located beyond the axis X. With the frustoconical end face 32 so restricted, the roller 8 tracks the roller 6, and this insures stability in the bearing I.

Notwithstanding the stability afforded by the proper location of the point Y, the cage 10 insures that the rollers 6 and 8 of each pair remain aligned. To this end, it includes (FIG. 4) a center ring 34 that lies between the large end face 28 of the rollers 6 in the one row and the ends of rollers 8 in the other row beyond the regions where those end faces 28 and 32 of the rollers 6 and 8 are actually in contact. In addition, the cage 10 has bridges 36 which extend generally axially from the center ring 34 and lie between adjacent rollers 6 and 8 of the two rows. The bridges 36 that lie between the rollers 6 at their opposite ends merge with an end ring 38 that extends past the small ends of the rollers 6, thus creating pockets which receive the rollers 6. The bridges 36 that lie between the rollers 8 terminate at free ends and create more pockets which receive the rollers 8.

In the operation of the bearing I, the cone 2 rotates in the cup 4 or vice versa, but in either event, the rollers 6 roll along the raceways 12 and 22 and the rollers 8 along their raceways 14 and 24. The rollers 8 track the rollers 6 and vice versa, that is to say for every roller 6 a roller 8 remains synchronized with it. Pure rolling contact exists between the side faces of the rollers 6 and the raceways 12 and 22 along which they roll, because the rollers 6 are on apex. The same holds true with regard to the rollers 8 and the raceways 14 and 24 along which they roll, for the rollers 8 are likewise on apex. The rollers 8 prevent the rollers 6 from moving up the raceways 12 and 22 along which they roll and being expelled form the space between the cone 2 and cup 4. Likewise, the rollers 6 prevent the rollers 8 from moving up their respective raceways 14 and 24 and being expelled. Pure rolling contact also occurs along the lines ABC where the conical end faces 28 and 32 of the aligned rollers 6 and 8 of any pair are in contact.

A modified bearing II (FIGS. 5–7) in which pure rolling contact exists at all critical surfaces includes an inner race in the form of a segmented cone 42, an outer race in the form of a unitary cup 44, tapered rollers 46 and 48 arranged in two rows between the cone 42 and cup 44, spherical separating elements 50 organized in another row between the two rows of tapered rollers 46 and 48, and a cage 52 which receives the rollers 46 and 48 and the separating elements 50.

The cone 42 has two end segments 54 and 56 provided with beveled ends that face each other and wedge shaped separating segments 58 located between the end segments 54 and 56 at the beveled surfaces of the segments 54 and 56. When forced radially outwardly, the separating segments 58 drive the end segments 54 and 56 axially apart. The end segment 54 has a raceway 60 which tapers downwardly toward one end of the bearing II and away from separating segments 58 at an angle $\alpha_1$ relative to the axis X (FIG. 6). Likewise the end segment 56 has a raceway 62 which tapers downwardly toward the other end of the bearing II at an angle $\alpha_2$. In addition, the end segment 56 has a cylindrical raceway 64 that lies between the raceways 60 and 62 parallel to the axis X and hence at an angle $\alpha_3$ which is 0°.

The cup 44 has tapered raceways 66 and 68 presented toward the tapered raceways 60 and 62, respectively, of the cone 42. The raceways 66 and 68 lie at angles $\beta_1$ and $\beta_2$, respectively, with respect to the bearing axis X. In addition, the cup 44 has an intervening raceway 70 which is cylindrical and presented toward the intervening raceway 64 of the cone 42. Its angle $\beta_3$ with respect to the axis X is 0°.

The rollers 46 lie in a row between the raceways 60 and 66 of the cone 42 and cup 44, respectively, with essentially line contact existing between their tapered side faces and the raceways 60 and 66. The rollers 46 revolve about their center axes U (FIG. 6) and have large end faces 72 which are squared off with respect to the axes U. The largest radius $r_1$ of each roller 46 is at its end face 72. The rollers 48, on the other hand, lie between the raceways 62 and 68 of the cone 42 and cup 44, respectively, with essentially line contact existing between their side faces and the raceways 62 and 68. The rollers 48 have center axes V and large end faces 74 which are squared off with respect to the axes V. Each roller 48 has its largest diameter $r_2$ at its end face 74. The rollers 46 and 48 of the two rows are on apex.

For every roller 46 between the raceways 60 and 66 there exists a roller 48 between the raceways 62 and 68, so the rollers 46 and 48 are arranged in pairs, with the rollers 46 and 48 of any pair being aligned in the direction of the axis X. Moreover, between each pair of aligned rollers 46 and 48 lies a spherical separating element 50. Thus, the rollers 46 and 48 and the separating elements 50 are equal in number. The spherical separating elements 50, each of which has a radius $r_3$, roll along the intermediate raceways 64 and 70, with each rotating about an axis W. The tapered rollers 46 and 48 of any pair along their respective end faces 72 and 74 contact the spherical separating elements 50, so the separating elements 50 prevent the rollers 46 from moving up their raceways 60 and 66 and likewise the rollers 48 from moving up their raceways 62 and 68, but ultimately the rollers 46 back the rollers 48 and vice versa.

The cylindrical envelope occupied by the intervening raceway 64 on the cone 42 intersects the tapered cone raceway 60 at point D and the tapered cone raceway 62 at point G. The cylindrical envelope for the intervening raceway 70 on the cup 44 intersects the tapered cup raceway 66 at point F and the tapered cup raceway 68 at point J. The axis U of a tapered roller 46 that lies between the raceways 60 and 66 intersects a line connecting point D and F at point E. The flat end face 72 for the roller 46 lies along the line DEF. Likewise, the axis V of the tapered roller 48 that lies between the raceways 62 and 68 intersects a line connecting points G and J at point H. The flat end face 74 of the roller 48 lies along the line GHJ. The axis W of rotation for the spherical separating element 58 that lies between the two rollers 46 and 48 intersects the axis U of the roller 46 at point E and intersects the axis V for the roller 48 at point H. Lines DEF and GHJ represent lines of pure rolling contact in the bearing II. Within the bearing II the relationships set forth in the following formulas exist:

$$\frac{\sin\alpha_1}{\sin\beta_1} = \frac{\sin\alpha_2}{\sin\beta_2} = \frac{\sin\alpha_3}{\sin\beta_3} \qquad \text{(ii)}$$

and $$r_1 \cos 1/2(\alpha_1 + \beta_1) = r_2 \cos 1/2(\alpha_2 + \beta_2) = r_3 \cos 1/2(\alpha_3 + \beta_3) = r_3 \qquad \text{(iii)}$$

Since the rollers 46 and 48 are on apex, true rolling contact occurs between the rollers 46 and the raceways 60 and 66 along which they roll, and likewise true rolling contact exists between the rollers 48 and the raceways 62 and 68 along which they roll. Pure rolling contact also exists between the spherical separating element 50 and the rollers 46 and 48 at the line DEF and GHJ at the points where the separating elements 50 contact the end faces 72 and 74 of the rollers 46 and 48. Moreover, pure rolling contact occurs between the separating elements 50 and the intermediate raceways 64 and 70 along which they roll. Because of the relationships set forth in equations II and III all lines and points of pure rolling contact are synchronized, that is to say the rollers 46 and 48 of any set track the spherical separating element 50 that lies between them.

The cage 52 has (FIG. 7) intermediate rings 76 that form pockets for receiving the separating elements 50. It also has end rings 77 which are connected to the intermediate rings 76 through bridges 78 to form more pockets for the tapered rollers 46 and 48. The cage 50 insures that the rollers 46 and 48 and the intervening separating element 50 of any set remain in axial alignment.

Figure 8:
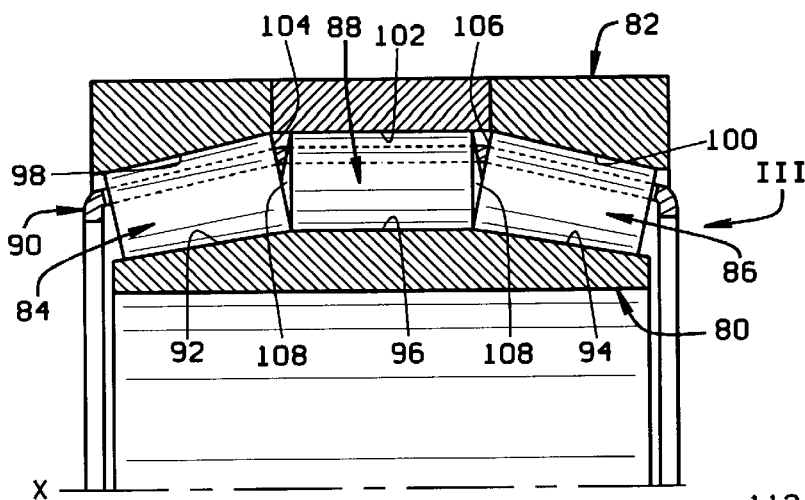
FIG. 8 is a sectional view of a bearing having tapered rollers in its end rows and cylindrical rollers in its middle row, with pure rolling contact at all critical surfaces.
Figure 10:
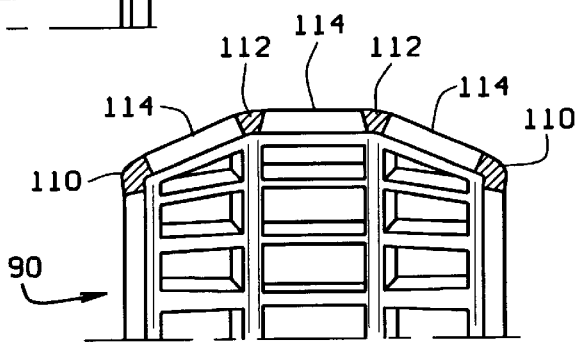
FIG. 10 is a fragmentary view of the cage for the bearing of FIG. 8.
Figure 9:
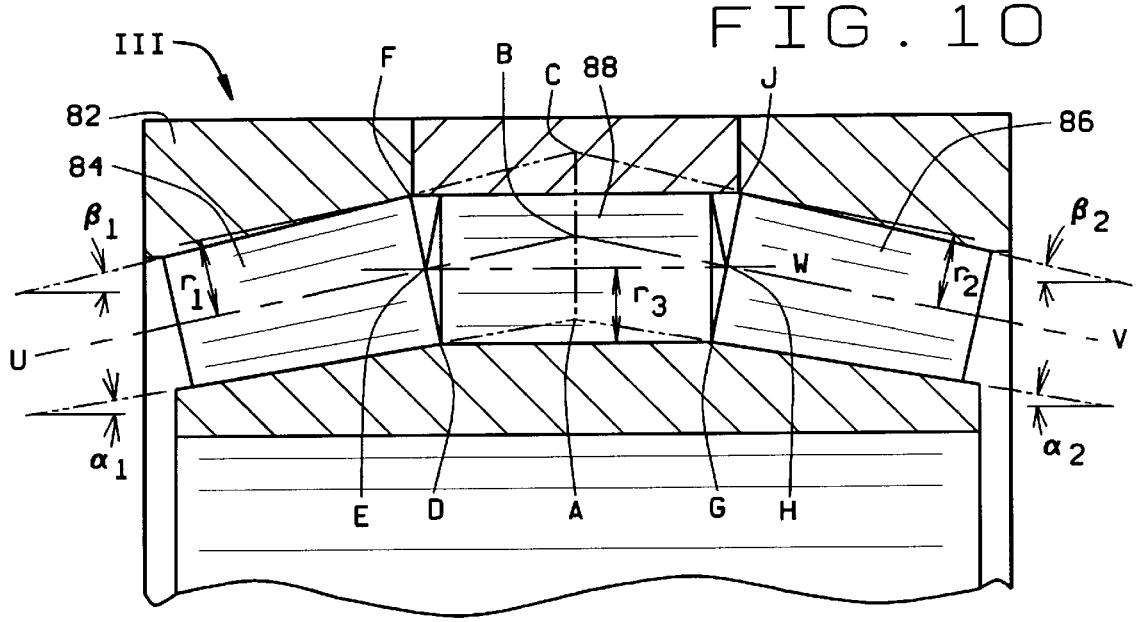
FIG. 9 is a sectional view similar to FIG. 8 and showing reference lines and points and angles.

Another modified bearing III (FIGS. 8–10) has an inner race in the form of a unitary cone 80, an outer race in the form of a segmented cup 82, tapered rollers 84 and 86 arranged in two rows between the cone 80 and cup 82, cylindrical rollers 88 arranged in a single row between the two rows of tapered rollers 84 and 86, and a cage 90 which receives the rollers 84, 86 and 88 of the three rows.

The cone 80 has tapered raceways 92 and 94 that are separated by an intermediate cylindrical raceway 96, with the tapered raceways 92 and 94 tapering downwardly at angles $\alpha_1$ and $\alpha_2$ (FIG. 9) from the intermediate raceway 96 which lies at an angle $\alpha_3$ of 0°. The segmented cup 82 has three raceways 98, 100 and 102 which are presented toward and encircle the raceways 92, 94 and 96, respectively, of the cone 80. The raceways 98 and 100 are tapered at angles $\beta_1$ and $\beta_2$, while the raceway 102, which lies between them, is cylindrical and lies at an angle $\beta_3$ of 0°.

The tapered rollers 84 are organized in a row between the tapered raceways 92 and 98 of the cone 80 and cup 82, respectively, with essentially line contact, and they on apex. Each has an axis of rotation U (FIG. 9) and a large end face 104 where it has its largest radius $r_1$. The end face 104 is flat and squared off with respect to the axis U. The rollers 86, on the other hand, are organized into a single row between the tapered raceways 94 and 100 of the cone 80 and cup 82, respectively, with essentially line contact and they are also on apex. Each roller 86 has an axis V and a large end face 106 where the roller 86 has its greatest radius $r_2$. The end face 106 is flat and is squared off with respect to the axis V.

The cylindrical rollers 88 lie in a single row between the intermediate cylindrical raceways 96 and 102 of the cone 80 and cup 82, respectively, and contact those raceways along their cylindrical side faces. Each cylindrical roller 88 lies between and indeed is axially aligned with a tapered roller 84 and a tapered roller 86, thus forming a set. Hence, the tapered rollers 84, the tapered rollers 86, and the cylindrical rollers 88 are equal in number. Each cylindrical roller 88 has an axis W and a diameter $r_3$. At each of its ends the roller 88 has a conical end face 108, the apex of which lies along the axis W of the roller 88. The conical end face 108 at one end of the roller 88 bears against the flat end face 104 for the tapered roller 82 with which the roller 88 aligns, there being line contact between the end faces 104 and 108. The conical end face 108 at the other end of the roller 88 bears against the flat end face 106 for the other tapered roller 86 with which cylindrical roller 88 aligns, again there being line contact between the conical end face 108 and the flat end face 106.

Within the bearing III, the cylindrical raceway 96 of the cone 80 intersects the tapered raceway 92 at point D and the tapered raceway 94 at point G. The envelope occupied by the cylindrical raceway 102 of the cup 82, intersects the tapered cup raceway 98 at point F and the tapered cup raceway 100 at point J. As to any set of aligned rollers 84, 86 and 88, the axis U of the tapered roller 84 intersects a line connecting points D and F at point E. The line DEF lies within the plane of the flat end face 104 for the roller 84. The axis V of the tapered roller 86 intersects a line connecting points G and J at H. The line GHJ lies within the flat end face 106 of the roller 86. The axis W of the intervening cylindrical roller 88 intersects the line DEF at point E and the line GHJ at point H. On the cylindrical roller 88 that conical end face 108 which bears against the flat end face 104 of the tapered roller 84 lies within the line DE and the end faces 104 and 108 are in contact along the line DE. Similarly the other conical end face 108 which bears against the flat end face 106 of the roller 86 lies within the line GH and the faces 104 and 108 are in contact along that line.

The following formulas express the relationship between the several angles and dimensions within the bearing III:

$$\frac{\sin\alpha_1}{\sin\beta_1} = \frac{\sin\alpha_2}{\sin\beta_2} = \frac{\sin\alpha_3}{\sin\beta_3} \qquad (iv)$$

and $$r_1 \cos 1/2(\alpha_1 + \beta_1) = r_2 \cos 1/2(\alpha_2 + \beta_2) = r_3 \cos 1/2(\alpha_3 + \beta_3) = r_3 \qquad (v)$$

Within the bearing III pure rolling contact exists between the tapered rollers 84 and the tapered raceways 92 and 98 along which they roll. Likewise pure rolling contact exists between the tapered rollers 86 and the tapered raceways 94 and 100 along which they roll. After all, the rollers 84 and 86 are on apex. Pure rolling contact also exists between the cylindrical rollers 88 and the cylindrical raceways 96 and 102 along which they roll. Finally, within each set of tapered rollers 84 and 86 and a cylindrical roller 88, pure rolling contact exists between the flat end faces 104 and 106 of the tapered rollers 84 and 86, on one hand, and the conical end faces 108 of the cylindrical rollers 88, on the other hand. By reason of the relationships set forth in equations (iv) and (v) the bearing III operates with all lines of pure rolling contact synchronized and thus the rollers 84, 86 and 88 track each other. While the cylindrical rollers 88 prevent the tapered rollers 84 from moving up their raceways 92 and 98 and the tapered rollers 86 from moving up their raceways 94 and 100, each tapered roller 84 is ultimately backed by a tapered roller 86 acting through the intervening cylindrical roller 88, and vice versa.

The cage 90 (FIG. 10) has end rings 110 and intermediate rings 112 which are connected by bridges 114 to form pockets that receive the tapered rollers 84 and 86 and cylindrical rollers 88, maintaining alignment between them. The cage 90 also serves to insure that for each cylindrical roller 88, a tapered roller 84 is aligned with its one end and a tapered roller 86 with its other end.

Figure 11:
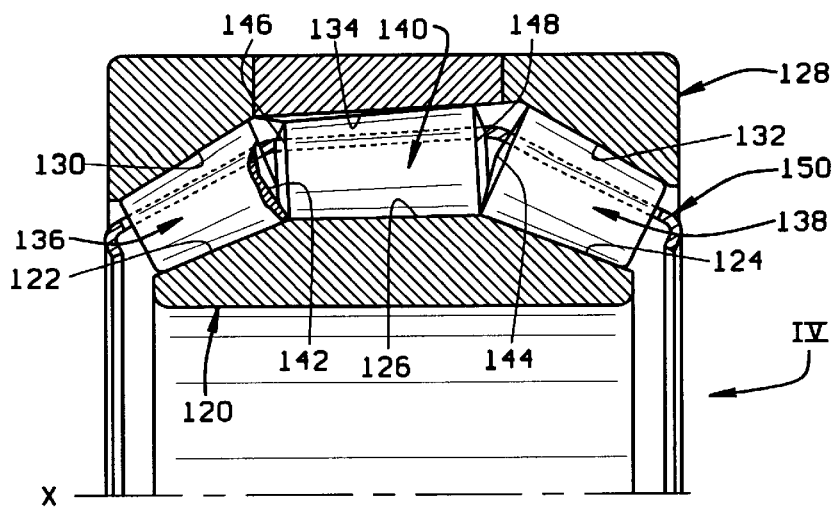
FIG. 11 is a sectional view of a triple row tapered roller bearing in which pure rolling contact exists at all critical surfaces.
Figure 13:
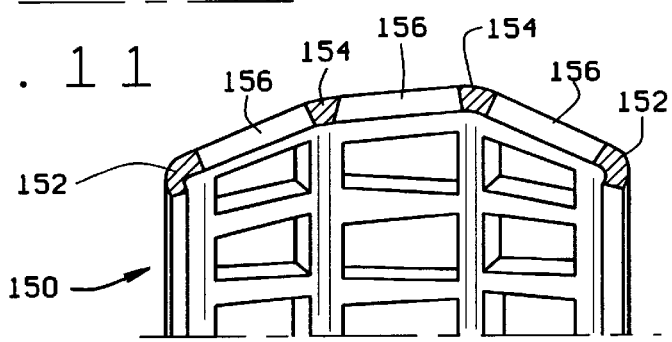
FIG. 13 is a fragmentary view of the cage for the bearing of FIG. 11.

Still another modified bearing IV (FIGS. 11–13) likewise has rollers arranged in three rows. To this end, the bearing IV has an inner race in the form of a unitary cone 120 having outwardly presented raceways 122, 124 and 126, each of which is tapered. The end raceway 122 lies at an angle $\alpha_1$ (FIG. 12) with respect to the bearing axis X and tapers downwardly away from the intermediate raceway 126. The other end raceway 124 lies at an angle $\alpha_2$ with respect to the bearing axis X and tapers downwardly away from the other end of the intermediate raceway 126. The intermediate raceway 126 tapers downwardly from the raceway 124 to the raceway 122 and lies at an angle $\alpha_3$ with respect to the axis X, and that angle is somewhat less than the angles $\alpha_1$ and $\alpha_2$ assumed by the raceways 122 and 124.

Figure 12:
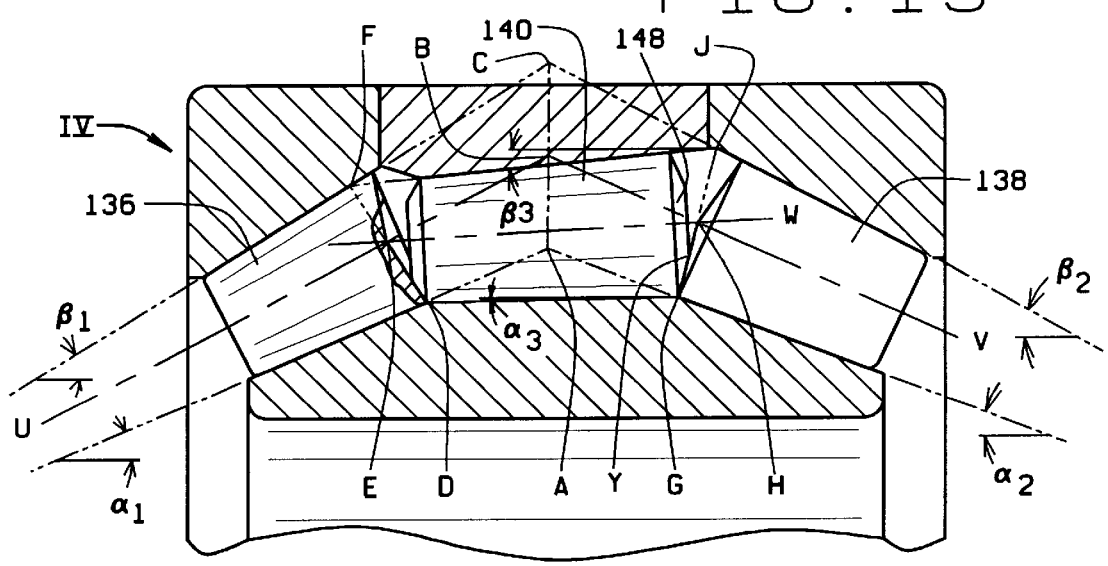
FIG. 12 is a sectional view similar to FIG. 11 and showing reference lines and points and angles.

The bearing IV also has an outer race in the form of a segmented cup 128 having end raceways 130 and 132 which lie around and are presented toward the end raceways 122 and 124, respectively, of the cone 120. The raceways 130 and 132 lie at angles $\beta_1$ and $\beta_2$, respectively (FIG. 12). The cup 128 also has an intermediate raceway 134 that lies around and is presented toward the intermediate raceway 126 of the cone 120. The intermediate raceway 134 is likewise tapered, it being at an angle P3 with respect to the bearing axis X.

The space between the cone 120 and cup 128 is occupied by tapered rollers 136, 138 and 140 arranged in three rows. The tapered rollers 136 lie between the raceways 122 and 130 on the cone 120 and cup 128 at one end of the bearing IV, there being essentially line contact. Each roller 136 has an axis U (FIG. 12) and a conical end face 142 which is depressed or concave. The axis U intersects the end face 142 at its apex. The tapered rollers 138 lie between the raceways 124 and 132 at the other end of the bearing IV, there being essentially line contact here as well. Each roller 138 has an axis V and a conical end face 144 that is convex. The axis V intersects the end face 144 at its apex. The tapered rollers 140 lie between the intermediate raceways 126 and 134, again with essentially line contact, and here they separate the tapered rollers 136 and 138. In this regard, the tapered rollers 136, 138 and 140 are equal in number. For each tapered roller 140 along the intermediate raceways 126 and 134, there exists a tapered roller 136 aligned with it at its small end and a tapered roller 138 aligned with it at its large end. Thus, the tapered rollers 136, 138 and 140 are arranged in sets of three, with the rollers 136, 138 and 140 of each set being aligned in the direction of the axis X for the bearing IV. Each tapered roller 140 has an axis W and two frustoconical end faces 146 and 148. The end face 146 is at the small end of the roller 140, and it bears against the concave conical and face 142 at the large end of the corresponding end roller 136, there being line contact between the two end faces 142 and 146. The other frustoconical end face 148 is at the large end of the tapered intermediate roller 140, and it bears against the convex conical end face 144 on the corresponding tapered end roller 138, again there being line contact between the two end faces 144 and 148.

The intermediate raceway 126 of the cone 120 intersects the end raceways 122 and 124, respectively, of the cone 120 at points D and G (FIG. 12). The envelope formed by the intermediate raceway 134 of the cup 128 intersects the envelopes formed by the tapered end raceways 130 and 132 of the cup 128 at points F and J, respectively. The axis U of the end roller 136 intersects the conical end face 142 of the roller at point E, which is the apex for the end face 142, and the point E lies along a line connecting the points D and F. It is along the line DEF that the frustoconical end face 146 of the aligned intermediate roller 140 contacts the conical end face of the roller 136. The axes U and W at the rollers 136 and 140 intersect at the point E. The axis V of the other end roller 138 for the set intersects the conical end face 144 of that roller at a point H which lies at the apex of the end face 144. The point H lies along a line that connects the points G and J. Here the axes V and W of the rollers 138 and 140 intersect. The frustoconical end face 148 at the large end of the intermediate roller 140 contacts the conical end face 144 of the end roller 138 along the line GHJ, there being line contact along this line, but the conical end face 148 does not go beyond point Y on the line GHJ. The perpendicular to the line GHJ at point Y intersects the axis V of the roller 138 beyond the axis X of the bearing IV. This helps that the rollers 138 and 140 of each set track or, in other words, remain synchronized. . All of the rollers 136, 138 and 140 are on apex.

The following angular relationships exist within the bearing IV:

$$\frac{\sin\alpha_1}{\sin\beta_1} = \frac{\sin\alpha_2}{\sin\beta_2} = \frac{\sin\alpha_3}{\sin\beta_3} \qquad (vi)$$

Finally, the bearing IV includes a cage 150 (FIG. 13) which also insures that the rollers 136, 138 and 140 aligned in sets of three. The cage 150 has end rings 152 which extend across the small ends of the end rollers 136 and 138 and intermediate rings 154 that extend between the end faces 142 and 146 of the end and intermediate rollers 136 and 140 and between the end faces 144 and 148 of the rollers 138 and 140 beyond the lines of contact between those end faces. The end and intermediate rings 152 and 154 are connected by bridges 156 and together with the rings 152 and 154 form pockets in which the rollers 136, 138 and 140 are confined.

True rolling contact occurs between the rollers 136 and the raceways 122 and 130, between the rollers 138 and the raceways 124 and 132, and between the rollers 140 and the raceways 126 and 134, because all of the rollers 136, 138 and 140 are on apex. The lines DEF define lines of true rolling contact between the end faces 142 of the end rollers 136 and the end faces 146 of the intermediate rollers 140. The lines GHJ likewise define lines of pure rolling contact between the end faces 144 of the end rollers 138 and the end faces 148 of the intermediate rollers 140. By reason of the relationship set forth in equation vi, all contact lines within the bearing IV are in synchronized motion when the bearing IV operates.

Since the rollers 136, 138 and 140 in the three rows of the bearing IV are tapered, each row may be placed in a condition of preload. This gives the bearing a high measure of rigidity, and enables it to rotate with extreme precision.

Figure 14:
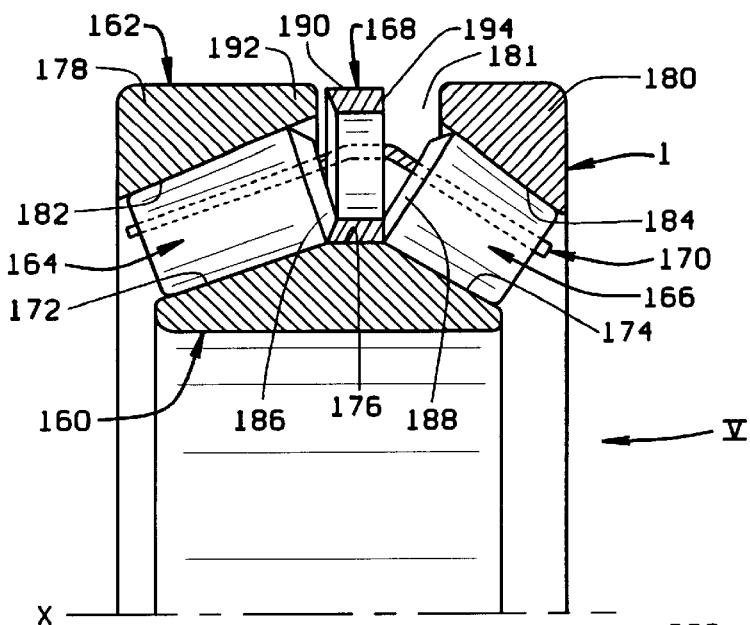
FIG. 14 is a sectional view of a double row tapered roller bearing in which the rollers of the two rows are separated by disks, there being pure rolling contact at all critical surfaces in the bearing.
Figure 16:
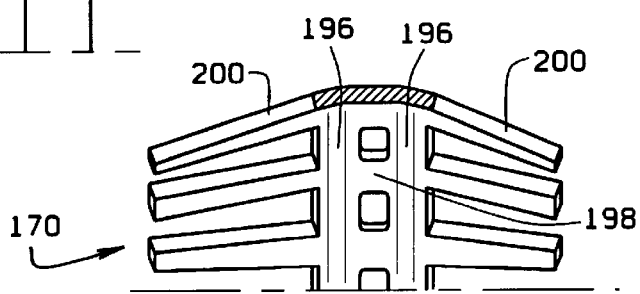
FIG. 16 is a fragmentary view of the cage for the bearing of FIG. 14.

Yet another modified bearing V (FIGS. 14–16) has rollers arranged in two rows, but the rollers of the two rows do not bear directly against each other as in the bearing I. The bearing V includes an inner race in the form of a unitary cone 160, an outer race in the form of a segmented cup 162, tapered rollers 164 and 166 arranged in two rows, separating elements or disks 168 between the rollers 164 and 166 of the two rows, and a cage 170 that confines the rollers 164 and 166 and the separating disks 168.

The unitary cone 160 has two tapered raceways 172 and 174 and an intervening cylindrical raceway 176. The tapered raceways 172 and 174, which lie at angles $\alpha_1$ and $\alpha_2$ with respect to the bearing axis X (FIG. 15), taper downwardly from the intervening raceway 176. The cup 162 consists of two segments 178 and 180 which surround the cone 160 and are separated by a space 181 that is located directly outwardly from the cylindrical raceway 176. The cup segment 178 has a tapered raceway 182 that is presented toward the raceway 172 of the cone 160 and lies at an angle $\beta_1$. The cup segment 180 has a tapered raceway 184 that is presented toward the other tapered raceway 174 of the cone 160 and lies at an angle $\beta_2$.

The tapered rollers 164 lie between the raceways 172 and 182 of the cone 160 and cup segments 178, and essentially line contact exists between the tapered side faces of the rollers 164 and the raceways 172 and 182. Each roller 164 has an axis U and a frustoconical end face 186 at its large end. The tapered rollers 166 lie between the other tapered raceway 174 of the cone 160 and the tapered raceway 184 of the other cup segment 180. Essentially line contact exists here as well, that is between the side faces of the tapered rollers 166 and the raceways 174 and 184. The rollers 166 have axes V and frustoconical end faces 188. The rollers 164 and 166 of the two rows are on apex.

The tapered rollers 164 and 166 are arranged end-to-end and hence are equal in number. Between each pair of end-to-end rollers 164 and 166 is one of the separating disks 168. Each disk 168 has a cylindrical exterior surface 190 that contacts the cylindrical raceway 176 of the cone 120, there being line contact between the two. It also has a concave conical end face 192 that is presented toward the end of the roller 164. Indeed, the frustoconical face 186 of the roller 164 bears against the concave end face 192 of the separating disk 168, there being line contact. The separating disk 168 also has a flat end face 194 that is presented toward the other roller 166, and the roller 166 along its frustoconical end face 188 contacts the flat end face 194, again establishing line contact. The separating disk 168 has a center axis W about which it revolves.

Figure 15:
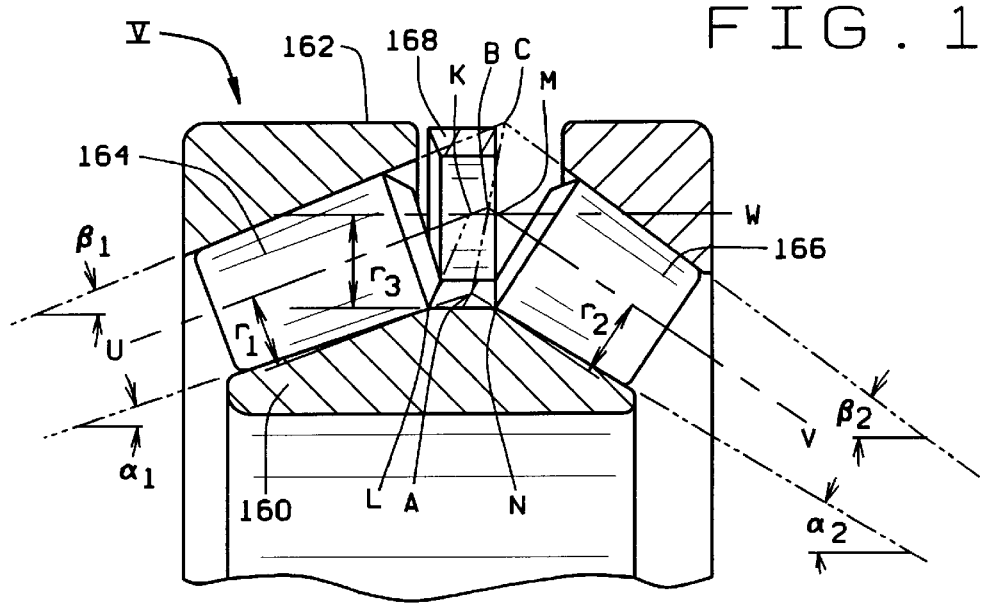
FIG. 15 is a sectional view similar to FIG. 14 and showing reference lines and points and angles.

The envelopes formed by the tapered raceways 172 and 174 of the cone 160 intersect at point A (FIG. 15). On the other hand, the raceway 172 intersects the cylindrical raceway 176 at point L, whereas the raceway 174 intersects the cylindrical raceway 176 at point N. The envelopes formed by the tapered raceways 182 and 184 of the cup 162 intersect at point C. The axes U and V of the tapered rollers 164 and 166 intersect at point B which lies along the line that connects points A and C. As a consequence, the following relationship exists in the bearing V:

$$\frac{\sin\alpha_1}{\sin\beta_1} = \frac{\sin\alpha_2}{\sin\beta_2} \qquad (vii)$$

The axis U of the tapered roller 164 intersects the axis W of the separating element 168 at point K, whereas the frustoconical end face 186 on the tapered roller 164 runs out to the tapered side face of the roller at point L which represents the largest radius $r_1$ on the roller 164. Along the line connecting points L and K pure rolling contact exists between the end faces 186 and 192 of the roller 164 and the separating disk 168, respectively.

The axis V of the other tapered roller 166 intersects the axis W of the separating disk 168 at a point M, whereas the frustoconical end face 188 of the roller 166 runs out into the tapered side face of the roller 166 at point N along the tapered raceway 174, and the point N represents the greatest radius $r_2$ on the roller 166. The line connecting the points N and M lies in the plane of the flat end face 194 for the separating disk 168 and represents a line of pure rolling contact between the end face 188 of the roller 166 and the flat end face 194 of the separating disk 168. When the bearing V operates, all contact lines are in synchronized motion and the rollers 164 and 166 and separating element 168 of each set track each other.

To insure that the line contacts between the two rollers 164 and 166 and the separating disk 168, remain stable, so the rollers 164 and 166 and the separating disk 168 of any set do not drift out of alignment, it is recommended that the radius $r_3$ of the exterior surface 190 on the separating disk 168 equal or exceed the amount set forth in the following formula:

$$r_3 = \max\left\{\frac{r_1}{\cos\frac{1}{2}(\alpha_1 + \beta_1)}, \frac{r_2}{\cos\frac{1}{2}(\alpha_2 + \beta_2)}\right\} \quad \text{(vii)}$$

The cage 170 for the bearing V has intermediate rings 196 which lie along either side of the separating disks 168 and bridges 198 which connect the rings 196 to form pockets which receive the separating disks 168. The cage 170 has more bridges 200 which project from the ring 196 into the spaces between adjacent tapered rollers 164 and 166 where they separate the rollers 164 and 166 of the two rows. Thus, the cage 170 helps to insure that the rollers 164 and 170 and the disk 168 of any set remain aligned.

Still another modified bearing VI (FIGS. 17–19) like the bearing V, has its rollers arranged in two rows, but otherwise differs. The bearing VI has a unitary inner race or cone 210, a segmented outer race or cup 212, tapered rollers 214 and 216 organized in two rows between the cone 210 and cup 212, separating elements or disks 218 arranged in a row between the rows of rollers 214 and 216, and a cage 220.

The cone 210 has two raceways 222 and 224 which intersect and taper downwardly away from the line of intersection, lying at angles $\alpha_1$ and $a_2$, respectively, with respect to the axis X (FIG. 18). The cup 212 includes an end segment 226 that has a tapered raceway 228 which is presented toward the tapered raceway 222 on the cone 120 and is located at an angle $\beta_1$ to the bearing axis X. The cup 212 has another end segment 230 which has a tapered raceway 232 that is presented toward the other raceway 224 of the cone 210, it being oriented at an angle $\beta_2$ with respect to the axis X. Between the two cup segments 226 and 230 the cup 212 has a ring 234 provided with a cylindrical raceway 236 that is presented inwardly toward the cone 210, and a spacer 238 fits between the ring 234 and the end segment 226.

The tapered rollers 214 lie between the raceways 222 and 228 of the cone 210 and cup 212, respectively, there being essentially line contact between side faces of the rollers 214 and the raceways 222 and 228. Each roller 214 has an axis U and a concave conical end face 240 at its large end, with the apex of the end face lying along the axis U. The tapered rollers 216 lie between the other raceway 224 of the cone 210 and the tapered raceway 232 of the other cup segment 230. Again, essentially line contact exists between the side faces of the rollers 216 and the raceways 224 and 232. Each roller 216 has an axis V and at its large end a concave conical end face 242, the apex of which lies along the axis V. The rollers 214 and 216 are on apex.

The rollers 214 and 216 are arranged in pairs between the cone 210 and cup 212 and within each pair the rollers 214 and 216 align in the direction of the bearing axis X. Moreover, one of the separating disks 218 lies between and separates the rollers 214 and 216 of each pair. The separating disks 218 are confined radially by the ring 234.

Each separating disk 218 has an axis W and a cylindrical exterior surface 244 about that axis W. The surface 244 bears against the cylindrical raceway 236 of the ring 234, there being line contact between the surface 244 and raceway 236. In addition, the separating disk 218 has two frustoconical end faces 246 and 248 with the cylindrical surface 244 separating them at their peripheries. The end face 246 bears against the conical end face 240 for the tapered roller 214, while the end face 248 bears against the conical end face 242 for the tapered roller 216. Essentially line contact exists along the seated end faces 240 and 246 and the seated end faces 242 and 248.

The cage 220 of bearing VI (FIG. 19) has end rings 250 that extend across the small diameter ends of the tapered rollers 214 and 216 and bridges 252 that extend between adjacent rollers 214 and 216 and separating elements 218. The rings 250 and bridges 252 create pockets which receive the rollers 214 and 216 and the separating rings 218.

The two raceways 222 and 224 of the cone 210 intersect at a point A. The envelopes in which the raceways 228 and 232 of the cup 212 lie intersect at a point C. The axes U and V of the tapered rollers 214 and 216 intersect at point B that lies along a line connecting points A and C. Accordingly the following angular relationship exists:

$$\frac{\sin\alpha_1}{\sin\beta_1} = \frac{\sin\alpha_2}{\sin\beta_2} \quad \text{(viii)}$$

The line of contact between the conical end face 240 of the tapered roller 214 and the end face 246 of the separating disk 218 lies along a line that includes the point A, and intersects the cup raceway 222 at a point O. The axis U of the roller 214 intersect this line at the apex Q of the conical end face 246. The line of contact between the conical end face 242 of the roller 216 and the other frustoconical end face 248 on the separating element 218 lies along a line that includes the point A and intersects the cup raceway 232 at point P. The axis V of the roller 216 intersects this line at the apex R of the conical end face 248. The axis W of the separating disk 218 intersects the axis U for the roller 214 at point Q and intersects the axis V of the roller 216 at point R. The cylindrical raceway 236 of the ring 234 lies along a line connecting the points 0 and P.

Pure rolling contact exists between the rollers 214 and the tapered raceways 222 and 228, because the rollers 214 are on apex. The same holds true with respect to the rollers 216 and the raceways 224 and 232 along which they roll. The line AO along which the conical end face 240 of the roller 214 contacts the frustoconical end face 246 of the separating element 218 also sees pure rolling contact, as does the line AP along which the end face 242 of the roller 216 contacts other frustoconical end face 248 of the separating element 218. Finally, the line OP along which the cylindrical face 244 of the separating disk 218 contacts the cylindrical raceway 236 sees pure rolling contact. When the bearing VI operates, all lines of contact are in synchronized motion.

To insure that the contacts along the lines AO and AP remain stable, the radius $r_3$ of the cylindrical face 244 of the separating disk 218 should not be greater than:

$$r_3 = r_1 \cos \tfrac{1}{2}(\alpha_1 + \beta_1) \text{ or} \quad \text{(ix)}$$

$$r_3 = r_2 \cos \tfrac{1}{2}(\alpha_2 + \beta_2) \quad \text{(x)}$$

whichever is least.

While bearing I has two rows of rolling elements and the bearings II, III, IV, V and VI have three rows, bearings with greater than three rows may be constructed using the principles of the present invention. In any such bearing the following relationship should exist:

$$\frac{\sin\alpha_1}{\sin\beta_1} = \frac{\sin\alpha_2}{\sin\beta_2} = \frac{\sin\alpha_n}{\sin\beta_n}$$

where $\alpha_1$ and $\beta_1$ represents the angles of the raceways for the rolling elements at one end of the bearing $\alpha_2$ and $\beta_2$ represent the angles of the raceways for the rolling elements at the other end of the bearing $\alpha_n$ and $\beta_n$ represent the angles of the raceways for any intervening rolling elements in the bearing This invention is intended to cover all changes and modifications of the example of the invention herein chosen for purposes of the disclosure which do not constitute departures from the spirit and scope of the invention.

What is claimed is:

1. An antifriction bearing for accommodating rotation about an axis X, said bearing comprising: an inner race having first and second tapered raceways presented outwardly away from the axis X, with the first raceway of the inner race being at an angle $\alpha_1$ with respect to the axis X and the second raceway of the inner race being at an angle $\alpha_2$ with respect to the axis X; an outer race having first and second tapered raceways presented inwardly toward the axis X, with the first raceway of the outer race being located opposite the first raceway of the inner race and at an angle $\beta_1$ with respect to the axis X and the second raceway of the outer race being located opposite the second raceway of the inner race and at an angle $\beta_2$ with respect to the axis X, the envelopes formed by first raceways intersecting the axis X generally at a first point and the envelopes formed by the second raceways intersecting the axis X generally at a second point, the envelopes formed by the raceways of the inner race intersecting each other between the first and second points and the envelopes formed by the raceways of the outer race also intersecting each other between the first and second points, the relationship between the angles $\alpha_1$, $\alpha_2$, $\beta_1$ and $\beta_2$ being generally such that:

$$\frac{\sin\alpha_1}{\sin\beta_1} = \frac{\sin\alpha_2}{\sin\beta_2};$$

first rolling elements located between and being in essentially line contact with the first raceways and second rolling elements located between and being in essentially line contact with the second raceways, there being for each first rolling element a second rolling element generally aligned with it, whereby the first and second rolling elements are organized in sets, the second rolling element in any set preventing axial displacement of the first rolling element in the set and vice versa.

2. A bearing according to claim 1 wherein the first and second rolling elements of any set contact each other.

3. A bearing according to claim 1 wherein the first and second rolling elements are tapered rollers having large end faces, and the first and second rolling elements of any set contact each other at their large end faces.

4. A bearing according to claim 1 wherein the first and second rolling elements are tapered rollers having large end faces, with the large end face of the first rolling element of any set being presented toward the large end face of the second rolling element of the set, and further comprising a discrete separating element located between the first and second rolling elements of each set, the separating element for a set contacting the large end faces of the first and second rolling elements of the set, there being pure rolling contact between the separating element of a set and the large end faces for the first and second rolling elements of the set.

5. A bearing according to claim 1 wherein the inner race has a third raceway located between its first and second raceways at an angle $\alpha_3$ with respect to the axis X; wherein the outer race has a third raceway located between its first and second raceways at an angle $\beta_3$ with respect to the axis X; wherein third rolling elements are located between the third raceways, there being within each set of first and second rolling elements a third rolling element located between the first and second rolling elements; and wherein the angular relationship between the raceways is such that:

$$\frac{\sin\alpha_1}{\sin\beta_1} = \frac{\sin\alpha_2}{\sin\beta_2} = \frac{\sin\alpha_3}{\sin\beta_3}$$

6. A bearing according to claim 5 wherein each first rolling element has a maximum radius $r_1$, each second rolling element has a maximum radius $r_2$, and each third rolling element has a maximum radius $r_3$; and wherein the following relationship exists:

$$r_1 \cos \tfrac{1}{2}(\alpha_1+\beta1)=r_2 \cos \tfrac{1}{2}(\alpha_2+\beta2)=r_3 \cos \tfrac{1}{2}(\alpha_3+\beta3).$$

7. A bearing according to claim 1 wherein one of the races has an intervening raceway between its first and second raceways; wherein the bearing further comprises separating elements located along the intervening raceway and between the first and second rolling elements, with the separating elements having a radius $r_3$ there being a separate separating element between the first and second rolling elements of each set, and wherein:

$$r_3 \geq \frac{r_1}{\cos\frac{1}{2}(\alpha_1 + \beta_1)} \text{ and } r_3 \geq \frac{r_2}{\cos\frac{1}{2}(\alpha_2 + \beta_2)}$$

8. A bearing according to claim 1 wherein one of the races has an intervening raceway between its first and second raceways; wherein the bearing further comprises separating elements located along the intervening raceway and between the first and second rolling elements, with the separating elements having a radius $r_3$, there being a separate separating element between the first and second rolling elements of each set, and wherein:

$$r_3 \leq r_1 \cos \tfrac{1}{2}(\alpha_1+\beta1) \text{ and } r_3 \leq r_2 \cos \tfrac{1}{2}(\alpha_2+\beta2).$$

9. A bearing according to claim 1 wherein the inner race has at least one additional raceway located between its first and second raceways at an angle $\alpha_n$ with respect to the axis X; wherein the outer race has at least one additional raceway located between its first and second raceways at an angle $\beta_n$ with respect to the axis X; wherein additional rolling elements are located between the additional raceways, there being within each set of first and second rolling elements at least one additional rolling element located between the first and second rolling elements of the set; and wherein the angular relationship between the raceways is such that:

$$\frac{\sin\alpha_1}{\sin\beta_1} = \frac{\sin\alpha_2}{\sin\beta_2} = \frac{\sin\alpha_n}{\sin\beta_n}$$

10. An antifriction bearing for accommodating rotation about a bearing axis X, said bearing comprising: an inner race having at least first and second raceways presented outwardly away from the axis X, the envelope of the first raceway of the inner race intersecting the envelope of the second raceway of the inner race at a point A; an outer race having at least first and second raceways presented inwardly toward the axis X, the envelope of the first raceway of the outer race intersecting the envelope of the second raceway of the outer race at a point C, the first raceway of the outer race being located opposite the first raceway of the inner race and the second raceway of the outer race being located opposite the second raceway of the inner race; the envelopes of the first raceways intersecting the axis X generally at a first point and the envelopes of the second raceways intersecting the axis X generally at a second point that is spaced from the first point; first tapered rollers arranged in a row between and being essentially in line contact with the first raceways; second tapered rollers arranged in a row between and being essentially in line contact with the second raceways, there being for each second roller a first roller that is aligned with it so that the first and second rollers are organized in sets; within each set of first and second rollers, the centerlines of the first and second rollers intersecting at a point B which lies along a straight line connecting the points A and C and is located between the first and second points that are along the axis X.

11. A bearing according to claim 10 wherein the first and second rollers contact each other at their large end faces.

12. A bearing according to claim 11 wherein the inner race has a third raceway which is tapered and presented outwardly away from the axis; wherein the outer race has a third raceway which is tapered and presented inwardly toward the axis and opposite the third raceway of the inner race; wherein the third raceways are interposed between the first and second raceways and the first and second raceways have their greatest diameters adjacent to the third raceways; wherein third tapered rollers are arranged in a row between the third raceways and have end faces that are in contact with the large end faces of the first rollers and end faces that are in contact with the large end faces of the second rollers; and wherein the geometry of the third raceways and rollers and the opposite end faces of the second rollers is such that pure rolling contact exists between the side faces of the third rollers and the third raceways and between the end faces of the third rollers and the end faces of the first and second rollers, when one race rotates relative to the race.

13. A bearing according to claim 10 wherein the large end faces of the first and second rollers are conical and convex.

14. An antifriction bearing for accommodating rotation about an axis, said bearing comprising: an inner race having first and second tapered raceways presented away from the axis; an outer race having first and second tapered raceways presented inwardly toward the axis, with the first raceway of the outer race surrounding the first raceway of the inner race and the second raceway of the outer race surrounding the second raceway of the inner race, the first and second raceways having their greatest diameters remote from the ends of the races and their least diameters toward the ends of the races; at least one of the races having an intervening raceway located between the large ends of its first and second tapered raceways; first tapered rollers arranged in a row between the first raceways and having tapered side faces which contact the first raceways, establishing generally line contact, and end faces at the large ends of their tapered side faces; second tapered rollers arranged in a row between the second raceways and having tapered side faces which contact the second raceways, establishing generally line contact, and end faces at the large ends of their tapered side faces; the first rollers being aligned with the second rollers so that the end faces of the rollers in the first row are presented toward the end faces of the rollers in the second row; and separating elements located between the rollers of the first and second rows, each separating element having end faces which contact the end faces of the rollers between which that element lies and a peripheral surface which contacts the intervening raceway; the geometry of the rollers, the raceways, and the separating elements being such that pure rolling contact exists between:

(1) the side faces of the first rollers and the first raceways;

(2) the side faces of the second rollers and the second raceways;

(3) the end faces of the rollers and the end faces of the separating elements;

(4) the peripheral surfaces of the separating elements and the intervening raceway.

15. A bearing according to claim 14 wherein the separating elements are disks.

16. A bearing according to claim 15 wherein the end faces of the first rollers are convex and conical.

17. A bearing according to claim 16 wherein the intervening raceway is cylindrical and lies between the large ends of the first and second raceways on the inner race.

18. A bearing according to claim 16 wherein the intervening raceway is cylindrical and lies generally between the large ends of the raceways on the outer race.

19. A bearing according to claim 15 wherein those end faces of the disks which contact the convex and conical end faces of the first rollers are concave and conical.

20. A bearing according to claim 15 wherein the end faces of the first rollers are concave and conical, and those end faces of the disks which contact the end faces of the first rollers are convex and conical.

21. A bearing according to claim 15 wherein the end faces of the second rollers are convex and conical.

* * * * *